United States Patent [19]

Hanna et al.

[11] Patent Number: 4,510,710
[45] Date of Patent: Apr. 16, 1985

[54] FISHING LURE

[75] Inventors: Thomas J. Hanna, 685 Johnson Rd., Jonesboro, Ga. 30236; Bill C. Logsdon; Elmer E. Meredith, both of Radcliff, Ky.

[73] Assignee: Thomas J. Hanna, Jonesboro, Ga.

[21] Appl. No.: 497,968

[22] Filed: May 25, 1983

[51] Int. Cl.³ .............................................. A01K 85/00
[52] U.S. Cl. ................................. 43/42.13; 43/42.14; 43/42.2; 43/42.51
[58] Field of Search ................ 43/42.13, 42.17, 42.14, 43/42.51, 42.2, 42.22, 42.31

[56] References Cited

U.S. PATENT DOCUMENTS

| | | |
|---|---|---|
| 1,547,619 | 7/1925 | Shannon . |
| 3,093,923 | 6/1963 | Jackson . |
| 3,230,657 | 1/1966 | Wiswald ............................ 43/42.17 |
| 3,257,750 | 6/1966 | Shannon . |
| 3,747,257 | 7/1973 | Haddock . |
| 4,033,065 | 7/1977 | Shannon . |
| 4,037,345 | 7/1977 | Dubois . |
| 4,201,008 | 5/1980 | Sparkman ......................... 43/42.13 |

Primary Examiner—Kenneth J. Ramsey
Assistant Examiner—Kurt Rowan
Attorney, Agent, or Firm—J. Rodgers Lunsford, III; Dale Lischer; William R. Cohrs

[57] ABSTRACT

The disclosed fishing lure is a surface-type lure for attracting large mouth bass. The lure includes a shank with a barbed hook at one end and an eyelet at the other. A body with a skirt is attached adjacent the hook and two rearwardly extending arms are attached at the eyelet. Each arm has a propeller rotatably mounted on it, and a flotation device is attached to the rear end of each arm. The propellers and flotation devices bring the lure to the surface quickly during retrieval and allow a slow rate of retrieval.

1 Claim, 2 Drawing Figures

FISHING LURE

BACKGROUND OF THE INVENTION

This invention relates generally to fishing lures and more particularly to a surface-type fishing lure designed to attract and catch large mouth bass.

In order to catch large mouth bass, it is necessary that a fishing lure first attract fish to it and then encourage them by its "action" to strike at it. Large mouth bass feed on insects and other living creatures that have fallen onto the surface of the water. When an insect or other living creature falls onto the surface of the water, it usually creates a disturbance either because it is injured or because it is trying to swim in order to escape from the water. The disturbance at the water's surface is what attracts the large mouth bass to its prey. Experienced fishermen thus know that in order to attract large mouth bass to a fishing lure, it is necessary for the fishing lure's action to simulate the action of a living creature that has accidentally fallen onto the surface of water and is trying to escape from the water.

In order to simulate the action of an injured insect or other living creature on the surface of a water, lures for large mouth bass are of the so called surface-type. Surface-type lures are cast into a particularly advantageous spot and then retrieved along the surface of the water much as an insect or living creature would try to swim along the surface of the water. The turbulence created by the lures results in both noise and highlights at the water's surface. The noise and the flashing highlights at the surface attract the large mouth bass and encourage them to strike at the lure. In addition the body of the lure adjacent the hook is constructed to give the appearance of an insect and to camouflage the hook.

The prior surface-type lures for large mouth bass have provided for turbulence in a variety of ways including spoons, blades, propellors, and spinners attached to the lures. In that regard the following patents are of interest: Dubois U.S. Pat. No. 4,037,345; Shannon U.S. Pat. No. 4,033,065; Haddock U.S. Pat. No. 3,747,256; Shannon U.S. Pat. No. 3,257,750; and Shannon U.S. Pat. No. 1,547,,619.

Of particular interest is Jackson U.S. Pat. No. 3,093,923. The Jackson patent provides a shank with a hook attached to its rear end. A skirt is attached adjacent to the hook to camouflage the hook. A spoon is attached to the shank forward of the skirt to provide turbulence during retrieval. At the forward end of the shank there is an eyelet for attaching the fishing line and an upwardly and rearwardly extending arm with a propellor rotatably attached thereto. As the Jackson lure is retrieved by the fisherman, the propellor is driven by the water flow and causes the lure to plane to the surface of the water. The propeller also helps create the required turbulence with the attending noise and flashing highlights in the water. The Jackson lure has been over the past several years a successful commercial product, but it suffers one significant drawback. Because of the weight and weight distribution of the Jackson lure, it is necessary, in order to keep the lure on the surface, to retrieve the Jackson lure at a fairly high rate of speed, much faster than a living insect or creature might swim if it had accidentally fallen onto the water's surface. Moreover, the Jackson lure requires nearly three or four feet of retrieval before it actually breaks the water's surface initially. As a result, it is necessary to cast the Jackson lure several feet beyond the spot where the fisherman would expect the large mouth bass to be lying in wait to feed. Sometimes, where the bass feed near the shoreline, there is no extra room beyond the feeding hole for the Jackson lure to be cast.

SUMMARY OF THE INVENTION

As a result of the foregoing, it is a primary object of the present invention to provide a surface-type fishing lure for large mouth bass which has flotation devices attached to it so that when the lure is retrieved, it comes to the surface rapidly and may be retrieved then at a slow rate of speed.

It is therefore a collateral object of the present invention to provide a surface-type fishing lure which has a plurality of propellers attached forwardly of the hook, the body of the lure and the flotation devices, which propellers are spaced so that when they turn in response to being pulled through the water, they strike each other thus producing both additional noise and turbulance at the surface of the water.

Other objects and advantages of the invention will become apparent upon reading the following detailed description and upon reference to the drawings.

DETAILED DESCRIPTION OF THE INVENTION

While the invention will be described in connection with a preferred embodiment, it will be understood that we do not intend to limit the invention to that embodiment. On the contrary, we intend to cover all alternatives, modifications and equivilents as may be included within the spirit and scope of the invention as defined by the appended claims.

Figure 1:
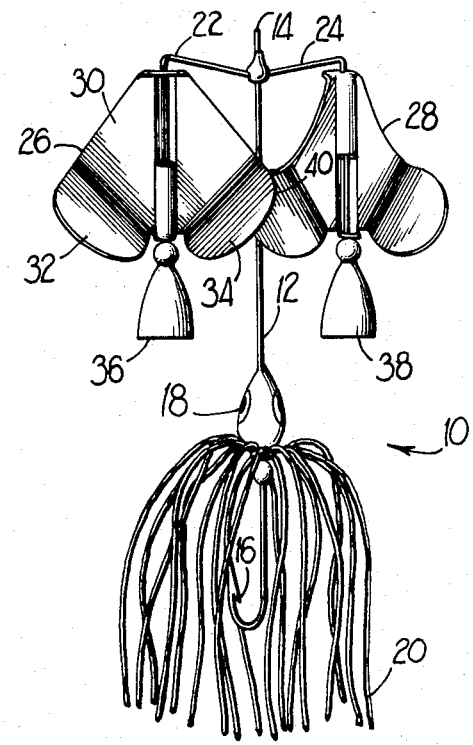
FIG. 1 is a top plan view of the surface-type fishing lure of the present invention.
Figure 2:
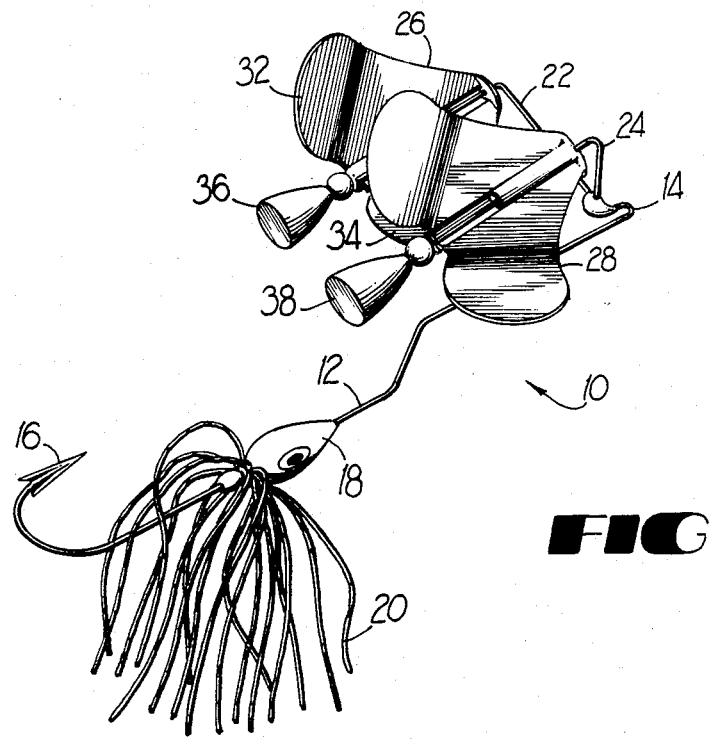
FIG. 2 is a side perspective view of the surface-type fishing lure of the present invention.

Turning to FIG. 1, there is shown a surface-type fishing lure 10 of the present invention. The fishing lure comprises a metal shank 12 which has an eyelet 14 at one end and a hook 16 at the opposite end. The eyelet 14 is provided in order that a fishing line may be secured to the lure in the ordinary manner.

Adjacent the hook 16, a weighted body 18 is attached to the shank 12. A skirt 20 is attached to the body 18 to attract visually large mouth bass and to camouflage the hook 16.

Adjacent the eyelet 14 on the shank 12 are two upwardly and rearwardly extending arms 22 and 24. Propellers 26 and 28 are mounted for rotation on arms 22 and 24 respectively. The propellers 26 and 28 each have a flat delta-shaped section 30 (shown in FIG. 1 with respect to propeller 26) and two concavo-convex portions 32 at the rear portion of the delta shaped flat section 30. Thus, when the lure 10 is pulled through the water by a line attached to eyelet 14, the water passes across the flat delta-shaped section 30 of the propeller 26 and impacts on the concavo-convex portions and causes the propeller 26 to rotate upon arm 22. Likewise propeller 28 rotates on arm 24.

As the propeller 26 turns, the flat delta-shaped section 30 of the propeller planes through the water and provides lift to the lure 10. Likewise propeller 28 provides lift.

At the end of each arm 22 and 24 are flotation devices 36 and 38 respectively. The flotation devices, help offset a portion of the weight of the body 18 and the shank 12 so that the planing action of the propellers 26 and 28 can rapidly and at a slow velocity bring the lure to the surface of the water.

It will also be noted by reference to FIG. 1 that edges 40 of propeller 26 extend past the center line (which coincides with shank 12 in FIG. 1) between the axes of rotation of the propellers 26 and 28. The edges of propeller 28 likewise extend past the center line between the two axes of rotation. As a result, as the two propellers rotate in response to being pulled through the water, the propellers strike each other.

When the lure 10 with its unique construction is cast into the water, the flotation devices 36 and 38 which are located rearwardly of the propellers and extend toward the body of the lure, serve to balance the lure and to offset part of the weight of the body and shank of the lure so that when the lure is retrieved, the planing action of the propellers can bring the lure to the surface rapidly and maintain the lure at the surface when retrieval is done at a slow rate. The two propellers provide extra left and balance to assure the hook and body are always properly oriented during retrieval. The rate of retrieval is less than half that of the Jackson lure.

In addition, as previously noted, the fish are attracted to the lure in the first instance by the noise it creates on the surface of the water. The two propellers not only create turbulance as they rotate in the water, but they also strike together in a random fashion to produce further noise and turbulance. Therefore, the combination of the slow retrieval of the lure in conjunction with the double propellers producing turbulance and striking sounds serves to attract large mouth bass to the lure.

We claim:

1. A fishing lure comprising:
(a) a shank with barbed hook means at its rear end and eyelet means at its front end;
(b) a body with a skirt attached to the shank adjacent the hook means;
(c) a plurality of arms attached to the shank adjacent the eyelet means and having rear portions extending generally toward the body from the eyelet means;
(d) propeller means rotatably mounted on the arms' rear portions and wherein the arms' rear portions are spaced apart and the propellers are dimensioned so that when the propellers turn in response to movement of the lure in the water, the propellers strike each other only as a result of their rotation and provide lift to the lure; and
(e) flotation devices mounted on the arms' rear portions rearward of the propellers.

* * * * *

Notice of Adverse Decisions in Interference

In Interference No. 102,138, involving Patent No. 4,510,710, T. J. Hanna, B. C. Logsdon and E. E. Meredith, FISHING LURE, final judgment adverse to the patentees was rendered Jan. 29, 1991, as to claims 1, 3, 5, 6, 9-14 and 16-19.

*(Official Gazette August 27, 1991)*